(12) United States Patent
Walker et al.

(10) Patent No.: US 10,127,186 B2
(45) Date of Patent: Nov. 13, 2018

(54) SUBSCRIBER STATION FOR A BUS SYSTEM AND METHOD FOR REDUCING LINE-CONDUCTED EMISSIONS IN A BUS SYSTEM

(71) Applicant: Robert Bosch GmbH, Stuttgart (DE)

(72) Inventors: Steffen Walker, Reutlingen (DE); Axel Pannwitz, Radebeul (DE); Ingo Hehemann, Hagen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 95 days.

(21) Appl. No.: 15/033,557

(22) PCT Filed: Oct. 20, 2014

(86) PCT No.: PCT/EP2014/072410
§ 371 (c)(1),
(2) Date: Apr. 29, 2016

(87) PCT Pub. No.: WO2015/067457
PCT Pub. Date: May 14, 2015

(65) Prior Publication Data
US 2016/0283435 A1    Sep. 29, 2016

(30) Foreign Application Priority Data

Nov. 8, 2013 (DE) .......................... 10 2013 222 789

(51) Int. Cl.
*G06F 13/20* (2006.01)
*H03K 17/687* (2006.01)
(Continued)

(52) U.S. Cl.
CPC ............ *G06F 13/4291* (2013.01); *G06F 1/26* (2013.01); *H04L 25/0274* (2013.01); *H04L 2012/40215* (2013.01)

(58) Field of Classification Search
None
See application file for complete search history.

(56) References Cited

U.S. PATENT DOCUMENTS

2004/0124905 A1* 7/2004 Haase .................... H03K 5/151
                                                       327/437
2006/0181914 A1* 8/2006 Ferraiolo .................. G06F 5/10
                                                       365/89
(Continued)

FOREIGN PATENT DOCUMENTS

CN       1666478 A       9/2005
DE       10250576        5/2004
(Continued)

OTHER PUBLICATIONS

International Search Report dated Jan. 29, 2015 of the corresponding International Application PCT/US2014/072410 filed Oct. 20, 2014.

*Primary Examiner* — Hyun Nam
(74) *Attorney, Agent, or Firm* — Norton Rose Fulbright US LLP; Gerard Messina

(57) ABSTRACT

A subscriber station for a bus system and a method for reducing line-conducted emissions in a bus system are provided. The subscriber station includes a first delay element for delaying a signal of a bus of the bus system and a second delay element for delaying a signal of a bus of the bus system, the delay time of the first and second delay element being capable of being digitally set as a function of the bus state or independently for rising and falling signal edges at the bus of the bus system in order to carry out a signal symmetrization during the rising and falling signal edge at the bus.

13 Claims, 4 Drawing Sheets

(51) Int. Cl.
 *G06F 13/42* (2006.01)
 *H04L 25/02* (2006.01)
 *G06F 1/26* (2006.01)
 *H04L 12/40* (2006.01)

(56) References Cited

U.S. PATENT DOCUMENTS

2008/0205498 A1\* 8/2008 Liebermann ........... H03K 17/16
 375/221
2016/0254926 A1\* 9/2016 Walker ................ H04L 12/4135
 375/316

FOREIGN PATENT DOCUMENTS

| | | |
|---|---|---|
| DE | 102009000697 | 8/2010 |
| DE | 102012202203 | 8/2012 |
| EP | 1376962 | 1/2004 |

\* cited by examiner

«SUBSCRIBER STATION FOR A BUS SYSTEM AND METHOD FOR REDUCING LINE-CONDUCTED EMISSIONS IN A BUS SYSTEM

FIELD

The present invention relates to a subscriber station for a bus system and to a method for reducing line-conducted emissions in a bus system, in which a symmetrization is achieved of the switching edges that occur during a switching process of a bus signal.

BACKGROUND INFORMATION

The CAN bus is a differential bus system that places high demands on signal symmetrization. In this context, the better the signal symmetrization, the lower the radio-frequency interference radiation and the interference at a subscriber station, such as for example a car radio. The opposite-phase signals CAN_H and CAN_L must be controlled in such a way that their mean value deviates as little as possible from center voltage VCC5/2=2.5V.

Currently, the signal symmetrization is achieved in that the resistances of the switches to ground GND and to the potential VCC5 are balanced in such a way that, in the dominant bus state, or dominant state of the bus, in which the difference voltage of the signals CAN_H–CAN_L has a value of approximately 2V, the mean value voltage is 2.5V. The balancing of the switch resistances takes place for example through suitable dimensioning or via regulating circuits described, for example, in German Patent Application No. DE 10250576 A1.

However, problems occur in the switching edges, because the driver stages for CAN_H and CAN_L have different delay times. These delays are a function of process conditions and of temperature, and are subject to aging. Thus, a fixed runtime compensation can achieve only an incomplete reduction of interference peaks in the mean value voltage.

SUMMARY

An object of the present invention is to provide a subscriber station for a bus system, and a method, that solve the problems named above. In particular, a subscriber station for a bus system and a method are provided in which a symmetrization is achieved of the switching edges that occur during a switching process of a bus signal, with the goal that the mean value voltage during the switching process has as small a deviation as possible from the ideal value VCC5/2, and that a significant reduction of the radiated interference is possible, and that an optimal symmetrization of the bus signal can take place even given aging and temperature drift.

The object may be achieved by a subscriber station for a bus system in accordance with an example embodiment of the present invention. The example subscriber system includes a first delay element for delaying a signal of a bus of the bus system and a second delay element for delaying a signal of a bus of the bus system, the delay time of the first and second delay element being a function of the bus state, or being capable of being digitally set independently for rising and falling signal edges at the bus of the bus system, in order to carry out a symmetrization of the signal during the rising and falling signal edge at the bus.

With the subscriber station, the delay times for the driver stages for CAN_H and CAN_L can be matched to one another even in long-term operation. Thus, interference peaks in the mean value voltage can be effectively compensated even given aging and temperature drift of the subscriber station. Therefore, an optimal symmetrization is possible even when there is aging and temperature drift.

In addition, with the subscriber station, a symmetrization is possible of the signal switching edges that occur during a switching process. In this way, current errors in different signal paths, which can occur due to component mismatch, can be avoided.

In addition, the radiated interference is significantly reduced.

The subscriber station can in addition have a transmit device for transmitting signals to the bus, the first and second delay element being situated in the CAN_L signal path or in the CAN_H signal path of the transmit device.

In the subscriber station, the delay elements may possibly be fashioned in such a way that the delay time of the delay elements is definitely smaller up to definitely larger than the comparable delay time of the complementary path.

The subscriber station described above can in addition have a summation block for the summation of the voltage at the bus, a capacitor for filtering the sum voltage outputted by the summation block, and an analog-digital converter for evaluating the sum voltage filtered by the capacitor, in order to carry out a signal symmetrization during the rising and falling signal edge. Here there is also the possibility that the subscriber station is fashioned for the evaluation of the voltage peaks in the sum voltage, in relation to its amplitude level and/or its temporal width, and/or in addition has a first accumulation register for counting voltage peaks in the sum voltage at the recessive-dominant transition of a bus signal, and a second accumulation register for counting voltage peaks in the sum voltage at the dominant-recessive transition of the bus signal, the first accumulation register being incremented for the recessive-dominant transition when there is a positive voltage peak in the sum voltage, thus reducing the delay of the first delay element, and the second accumulation register being incremented for the dominant-recessive transition when there is a positive voltage peak in the sum voltage, thus reducing the delay of the second delay element.

The subscriber station described above can be part of a bus system that has a bus and at least two subscriber stations that are connected to one another via the bus in such a way that they are capable of communicating with one another, at least one of the at least two subscriber stations being one of the subscriber stations described above.

The object mentioned above may, in addition, be solved by a method for reducing line-conducted emissions in a bus system in accordance with an example embodiment of the present invention. In the example method, in a subscriber station of the bus system a first delay element is provided for delaying a signal of a bus of the bus system, and a second delay element is provided for delaying a signal of a bus of the bus system, the delay time of the first and second delay element being a function of the bus state, or being set digitally independently for rising and falling signal edges at the bus of the bus system, in order to carry out a signal symmetrization during the rising and falling signal edge at the bus.

The method offers the same advantages as those mentioned above with reference to the subscriber station.

In the example method, the delay elements can be fashioned such that the delay time of the delay elements is definitely smaller up to definitely greater than the comparable delay time of the complementary path.

In addition, in the method, a summation block can sum the voltage at the bus, a capacitor can filter the sum voltage outputted by the summation block, and an analog-digital converter can evaluate the sum voltage filtered by the capacitor in order to carry out a signal symmetrization during the rising and falling signal edge at the bus. Here, the voltage peaks in the sum voltage can be evaluated with regard to their amplitude level and/or their temporal width, and/or a first accumulation register can count voltage peaks in the sum voltage at the recessive-dominant transition of a bus signal, and a second accumulation register can count voltage peaks in the sum voltage at the dominant-recessive transition of the bus signal, the first accumulation register being incremented for the recessive-dominant transition when there is a positive voltage peak, thus reducing the delay of the first delay element, and the second accumulation register being decremented for the dominant-recessive transition when there is a positive voltage peak in the sum voltage, thus increasing the delay of the second delay element.

The decrementing and incrementing hold for the case in which the delay elements are situated in the CAN_L path.

Further possible implementations of the present invention also include combinations not explicitly named of features or specific embodiments described above or below relating to the exemplary embodiments. Here, the person skilled in the art will also add individual aspects as improvements or supplements to the respective basic form of the present invention.

BRIEF DESCRIPTION OF THE DRAWINGS

Below, the present invention is explained in more detail with reference to the figures and on the basis of exemplary embodiments.

In the Figures, identical or functionally identical elements have been provided with the same reference characters, unless otherwise indicated.

DETAILED DESCRIPTION OF EXAMPLE EMBODIMENTS

Figure 1:
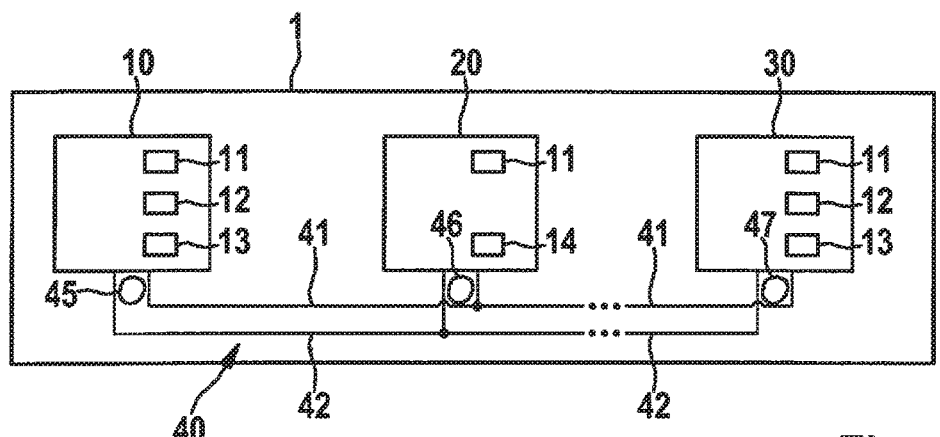
FIG. 1 shows a simplified block diagram of a bus system according to a first exemplary embodiment.

FIG. 1 shows a bus system 1 that can be for example a CAN bus system, a CAN-FD bus system, etc. Bus system 1 can be used in a vehicle, in particular a motor vehicle, an airplane, etc., or in a hospital, etc.

In FIG. 1, bus system 1 has a multiplicity of subscriber stations 10, 20, 30, each connected to a bus 40 with a first bus lead 41 and a second bus lead 42. Bus leads 41, 42 can also be named CAN_H and CAN_L, and are used to couple in the dominant level in the transmit state. Via bus 40, messages 45, 46, 47 can be transmitted in the form of signals between the individual subscriber stations 10, 20, 30. Subscriber stations 10, 20, 30 can for example be control devices or display devices of a motor vehicle.

As shown in FIG. 1, subscriber stations 10, 30 each have a communication control device 11, a transmit device 12, and a receive device 13. In contrast, subscriber station 20 has a communication control device 11 and a transceiver device 14. Transmit devices 12, receive devices 13 of subscriber stations 10, 30, and transceiver device 14 of subscriber stations 20 are each connected directly to bus 40, even though this is not shown in FIG. 1.

Communication control device 11 is used to control a communication of the respective subscriber station 10, 20, 30, via bus 40, with another subscriber station of subscriber stations 10, 20, 30 connected to bus 40. Transmit device 12 is used to send messages 45, 47 in the form of signals and for the reduction of line-conducted emissions in bus system 1, in order to fulfill the requirements of bus system 1 with regard to signal symmetrization, as is described in more detail below. Line-conducted emissions can occur on bus 40. Communication control device 11 can be realized as a conventional CAN controller. Receive device 13 can be realized as a conventional CAN transceiver, with regard to its receive functionality. Transceiver device 14 can be realized as a conventional CAN transceiver.

Figure 2:
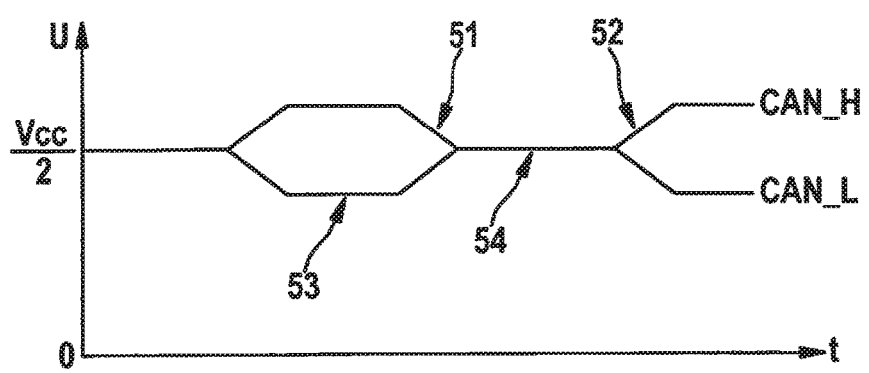
FIG. 2 shows a target voltage curve of a bus signal over time in the bus system according to the first exemplary embodiment.
Figure 4:
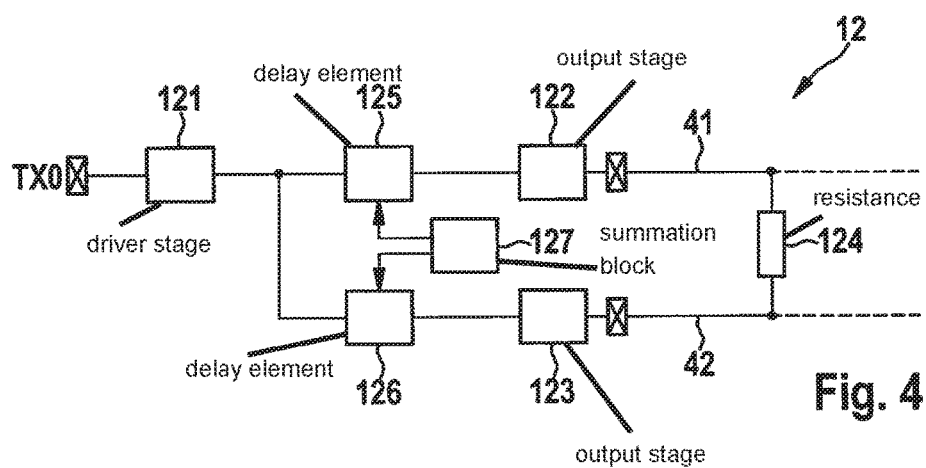
FIG. 4 shows an electric switching diagram of a transmit device of a subscriber station of the bus system according to the first exemplary embodiment.

FIG. 2 shows a voltage curve U plotted over time t with switching edges 51, 52, as produced by transmit device 12, which is shown in more detail in FIG. 4. Switching edge 51 corresponds to a transition of the signal from dominant state 53 to recessive state 54. Switching edge 52 corresponds to a transition of the signal from recessive state 54 to dominant state 53. The depicted voltage curve has switching edges 51, 52 like those of a target voltage curve to be produced by transmit device 12. Dominant state 53 corresponds to a dominant bus state. Recessive state 54 corresponds to a recessive bus state.

Figure 3:
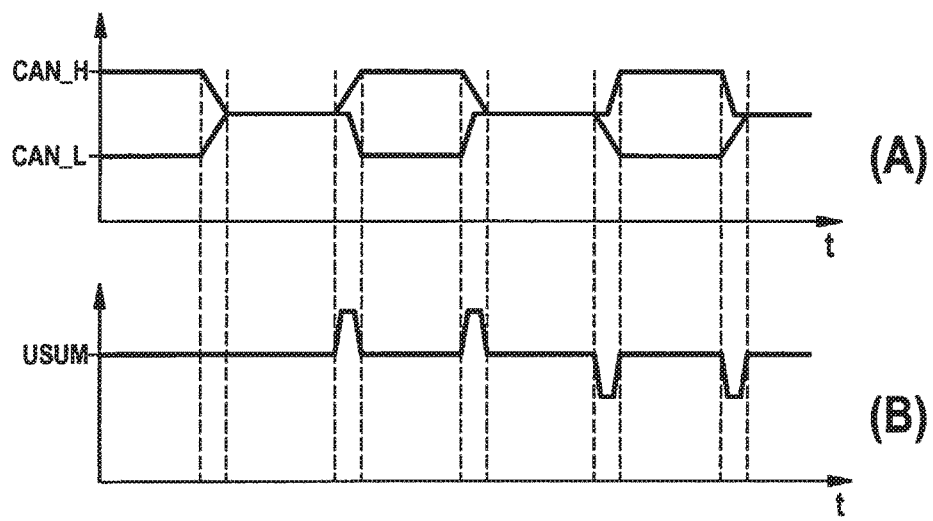
FIG. 3 shows various voltage curves over time in the bus system according to the first exemplary embodiment.

FIG. 3 shows various voltage curves in volts (V) over time t in microseconds (μs). The uppermost part (A) of FIG. 3 shows, one after the other, three different examples over time t of curves of the two bus voltages CAN_H and CAN_L, of which the example at left in FIG. 3 is already illustrated in FIG. 2. The part (B) shown thereunder of FIG. 3 shows the resulting curve, respectively for the specific example, of sum voltage USUM of the two bus voltages CAN_H and CAN_L, i.e. CAN_H+CAN_L. In the curve shown at left in FIG. 3 of the two bus voltages CAN_H and CAN_L, sum voltage USUM has a constant voltage value $V_{CC}$. In contrast, in the cases shown in the center and at right the bus voltages CAN_H and CAN_L are temporally offset to one another, causing voltage peaks to result in sum voltage USUM that are described in more detail in connection with FIG. 4.

Here it holds that the smaller the deviation of sum voltage USUM relative to supply voltage $V_{CC}$, the lower the emissions of a subscriber station 10, 20, 30.

Because the cause of the emissions is that the drivers for bus voltages CAN_H and CAN_L cannot be ideally uniformly controlled during the switching process at bus 40, artificial delays are built into the control circuits of the output stages for CAN_H and CAN_L, as is shown in FIG. 4.

As shown in FIG. 4, transmit device 12 has a driver stage 121, a CAN_H output stage 122 that conducts the current to bus lead 41 (CAN_H) of bus 40, and a CAN_L output stage 123 that conducts the current to bus lead 42 (CAN_L) of bus 40. Thus, bus lead 41 is available for the transmission of signal CAN_H, and bus lead 42 is available for the transmission of signal CAN_L.

In FIG. 4, bus leads 41, 42 are terminated with resistance 124. Thus, resistance 124 has the same resistance as the wave resistance of bus 40, for which reason no reflections occur at bus 40. The circuit in FIG. 4 is greatly simplified with regard to resistance 124. In reality, at each line end of bus leads 41, 42 there are present two 60Ω resistances, connected in series, for termination. The respective midpoint is set at 2.5 V.

As can also be seen from FIG. 4, transmit device 12 in addition includes a first and second delay element 125, 126 that can be set digitally, and a summation block 127 in which signal CAN_H and signal CAN_L are inputted and summed.

During operation of transmit device 12, i.e. in a method for reducing line-conducted emissions in bus system 1, driver stage 121 receives the transmit signal (TX signal) from terminal TX0 and generates current or voltage signals for CAN_H output stage 122 and CAN_L output stage 123. Summation block 127 in the circuit of FIG. 4 forms, during operation of transmit device 12, sum voltage CAN_H+CAN_L according to part (B) of FIG. 3.

As described above in reference to FIG. 2, CAN bus 40 can have two logical states, namely dominant state 53 and recessive state 54. In recessive state 54, the two output stages 122, 123 of FIG. 4 are switched off, and signal voltages CAN_H and CAN_L are drawn to 2.5 V through external wiring. In dominant state 53, the two output stages 122, 123 of FIG. 4 are switched active. Voltages CAN_H and CAN_L differ by, typically, 2 V, and have a symmetrical distance from center voltage 2.5 V, as shown in FIG. 2 and FIG. 3.

Here it holds that, as can be seen in part (B) of FIG. 3, during the transition from recessive state 54 to dominant state 53 there is always a positive voltage peak (spike) in sum voltage CAN_H+CAN_L, the output signal of summation block 127 in FIG. 4, if CAN_H output stage 122 is switched active temporally before CAN_L output stage 123. Conversely, there is a negative voltage peak (spike) in the sum voltage CAN_H+CAN_L if CAN_H output stage 122 is switched active temporally after CAN_L output stage 123.

In addition, it holds that, at the transition from dominant state 53 to recessive state 54, there is always a positive voltage peak in sum voltage CAN_H+CAN_L if CAN_H output stage 122 is switched off temporally after CAN_L output stage 123. Conversely, there is a negative voltage peak in sum voltage CAN_H+CAN_L if CAN_H output stage 122 is switched off temporally before CAN_L output stage 123.

According to the present exemplary embodiment, the delay through first and second digitally adjustable delay element 125, 126 in FIG. 4 is adapted as a function of the bus state. Here, for the transition from recessive state 54 (cf. FIG. 2) to dominant state 53 (cf. FIG. 2), a different bit setting is selected than for the transition from dominant state 53 to recessive state 54. In this way, the best result for the switching symmetry can be achieved.

In the present exemplary embodiment, CAN_L is preferably delayed in order to compensate the slower PMOS transistor in CAN_H output stage 122. Here, the goal is for the two edges of the bus signals, or bus voltages, CAN_H and CAN_L to occur at the same time. Because in the present case the CAN_H path is significantly slower than the CAN_L path, the delay time of the additional delay elements is selected such that using the adjustment range one can reliably symmetrize the switching times of the CAN_H path and of the CAN_L path. Here it is taken into account how much the delay time fluctuates in the CAN_H path, in particular as a result of temperature, process conditions, modeling imprecision, parasitic capacitances, etc., in order to determine the width of the compensation range of the additional delay(s) in the CAN_L path.

If, in a different variant embodiment, the CAN_H path is intended to have a speed similar to that of the CAN_L path, then, if there are no acceleration elements, one would have to delay one path (e.g. the CAN_H path) until it was reliably slower than the other path (again under certain assumptions) and then install the adjustable delay elements in the non-delayed path (e.g. CAN_L path).

Thus, with transmit device 12 of FIG. 4, a method is carried out for reducing line-conducted emissions in bus system 1. Here, transmit device 12 uses signal delays or signal delay times that can be digitally set as a function of the bus state, as described above.

Figure 5:
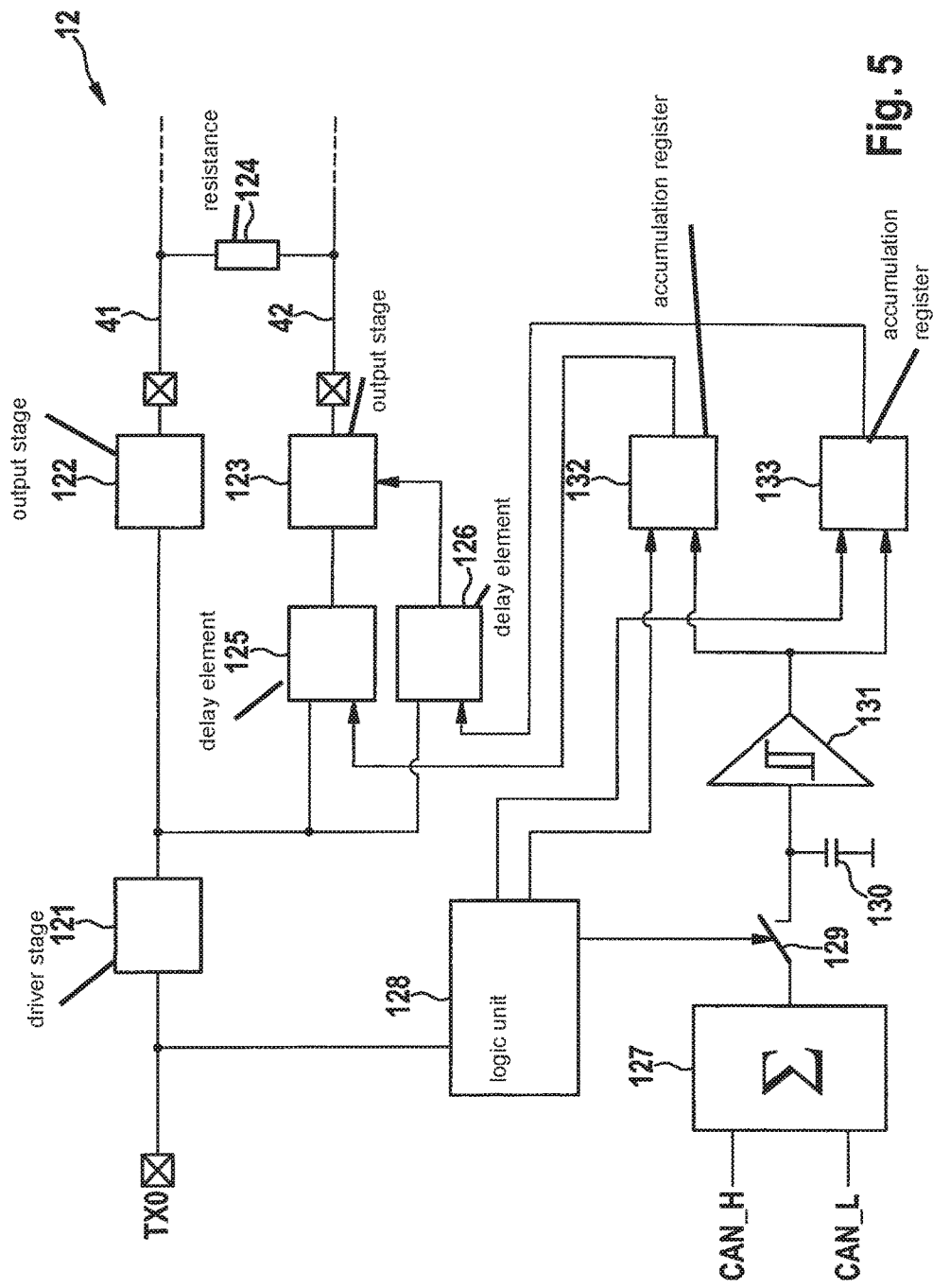
FIG. 5 shows an electric switching diagram of a transmit device of a subscriber station of the bus system according to a second exemplary embodiment.

FIG. 5 shows that transmit device 12, according to a second exemplary embodiment, includes—in addition to driver stage 121, CAN_H output stage 122, CAN_L output stage 123, resistance 124, a first and second digitally adjustable delay element 125, 126, and summation block 127—a logic unit 128 for switching a switch 129, a capacitor 130, an analog-digital converter 131, and a first and second accumulation register 132, 133. Analog-digital converter 131 can be a comparator that is a one-bit converter.

In the circuit in FIG. 5, sum voltage CAN_H+CAN_L formed by summation block 127 is switched to capacitor 130 during the transition from recessive state 54 to dominant state 53, or vice versa, as output signal of summation block 127, using logic unit 28 and switch 129. Capacitor 130 integrates a possible voltage peak, and is discharged before each bus switching process. The subsequent analog-digital converter 131 determines, after the bus switching process, i.e. the transition from recessive state 54 to dominant state 53 or vice versa, whether there was a positive or a negative voltage peak. The result is outputted to accumulation register 132 for the recessive-dominant transition and to accumulation register 133 for the dominant-recessive transition. The voltage peak polarity (spike polarity) is summed with +1 or −1 in the respective accumulation register 132, 133.

First and second digitally adjustable delay element 125, 126 are situated in the signal path of CAN_L output stage 123. Here, first digitally adjustable delay element 125 is controlled and set by accumulation register 132 for the recessive-dominant transition, the first accumulation register 132. In addition, second digitally adjustable delay element 126 is controlled and set by accumulation register 133 for the dominant-recessive transition, the second accumulation register 133. The setting range of delay elements 125, 126 is made such that the delay duration or delay time of delay elements 125, 126 is reliably smaller up to reliably larger than the comparable delay time of the complementary path. The complementary path of the signal path of CAN_L output stage 123 is the signal path of CAN_H output stage 122, and vice versa. Thus, in the present exemplary embodiment the delay time of first and second delay element 125, 126 is, overall, reliably smaller up to reliably larger than the comparable delay time that results due to circuit elements in the signal path of CAN_L output stage 123. The delay in the CAN_L path can always be adapted, via the control loop, to the delay in the CAN_H path, and can thus be brought to the same value. Possible deviations due to temperature fluctuations, process fluctuations, etc., are compensated.

The circuit of FIG. 5 now includes, with logic unit 128, switch 129, capacitor 130, and analog-digital converter 131, a digital control loop that is constructed such that for the recessive-dominant transition, given a positive voltage peak, accumulation register 132 is incremented, and the delay, or delay time, in the CAN_L signal path is thus reduced. The voltage peaks become smaller from step to step, and, starting from a certain point, the delay is too small, and negative voltage peaks occur. From this point on, the digital control loop holds the delay time close to the optimal value, so that there occur alternating positive and negative voltage peaks.

For the dominant-recessive transition, the digital control loop functions in an analogous manner.

Thus, with transmit device 12 of FIG. 5, a method is carried out for reducing line-conducted emissions in bus system 1. Here, transmit device 12 uses digitally adjustable signal delays or signal delay times independently for rising and falling signal edges at bus 40. During the signal edge, sum voltage CAN_H+CAN_L is measured at bus 40 with summation block 127 and is filtered with capacitor 130. The filtered measurement value is evaluated with analog-digital converter 131. Here it is determined whether during the switching process, i.e. the rising and falling signal edge, sum voltage CAN_H+CAN_L had a positive or negative voltage peak. If yes, the digital control loop minimizes the voltage peak, as described above.

Expressed otherwise, according to the present exemplary embodiment, in the described method with the circuit of FIG. 5 it is checked whether the sum voltage USUM exceeds a specified threshold value. If this is the case, the corresponding accumulation registers 132, 133 are incremented. At a specified frequency of the exceeding of the threshold value, setting mechanisms are adjusted. Here, for example capacitors at current mirrors, which can be activated bit-by-bit, are used as setting mechanisms which cause the desired delay times. In this way, the symmetrization of the switching edges during the switching process can be optimized.

Figure 6:
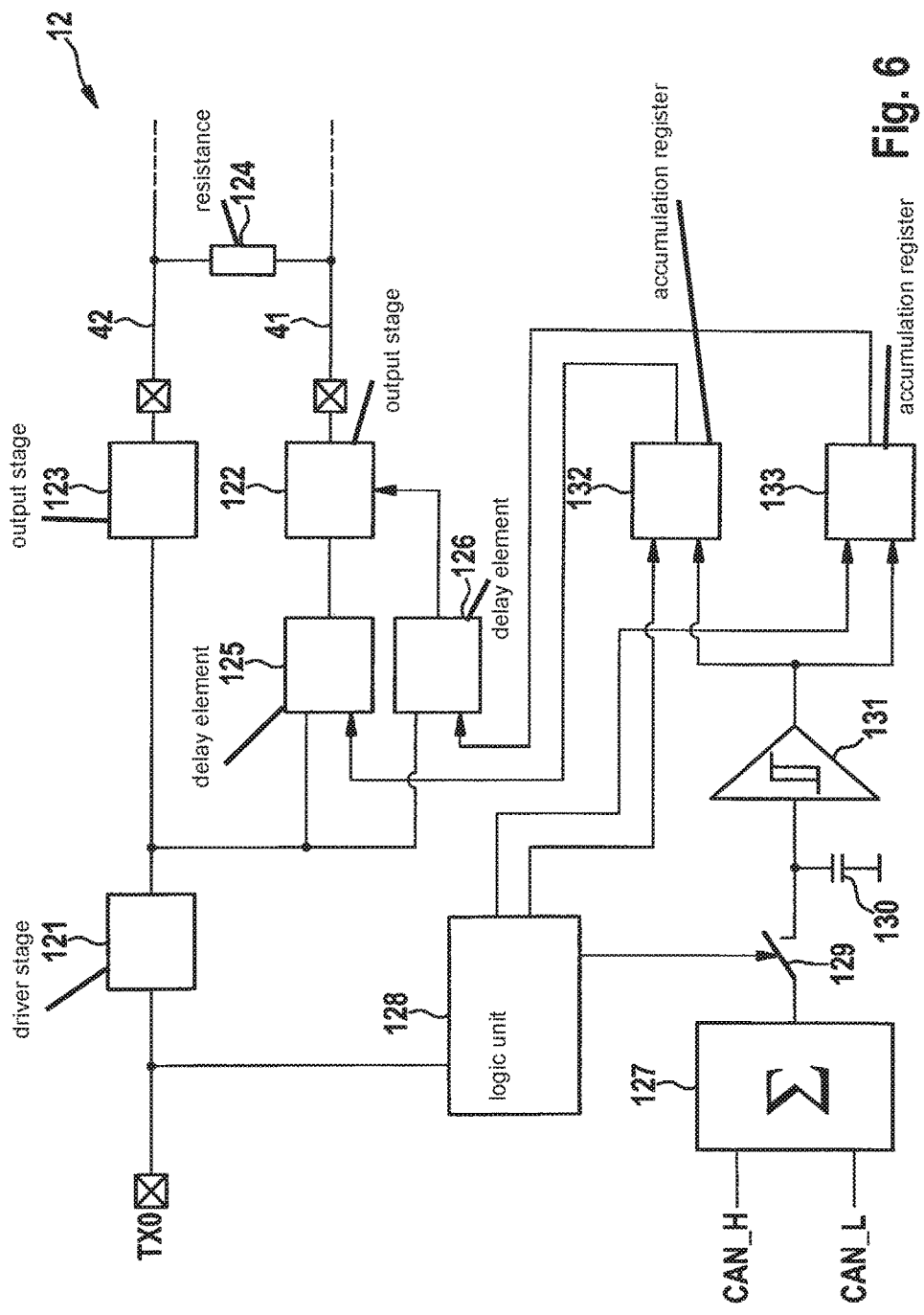
FIG. 6 shows an electric switching diagram of a transmit device of a subscriber station of the bus system according to a third exemplary embodiment.

According to a third exemplary embodiment illustrated in FIG. 6, first and second digitally adjustable delay element 125, 126 are situated in the signal path of CAN_H output stage 122. Here, the digital control loop functions in a manner analogous to the design of FIG. 5 according to the second exemplary embodiment. Otherwise, the third exemplary embodiment is realized as described in relation to the second exemplary embodiment.

According to a fourth exemplary embodiment, after summation block 127 two analog paths into two analog integrator blocks build, which replace accumulation registers 132, 133. The analog output voltage of the integrators is then be converted from analog to digital, and produces the control word for the digital delay elements.

In a modification of the present exemplary embodiment, the analog voltages of the integrator blocks are also used to control analog delay elements.

All embodiments described above of bus system 1, of subscriber stations 10, 30, of transmit device 12, and of the method can be used individually or in all possible combinations. In particular, any combination is possible of the features of the exemplary embodiments and their modification. In addition, in particular the following further modifications are possible.

Bus system 1 according to the exemplary embodiments is in particular a CAN network or a CAN FD network or a FlexRay network.

The number and configuration of subscriber stations 10, 20, 30 in bus system 1 is arbitrary. In particular, it is also possible for only subscriber stations 10 or only subscriber stations 30 or only subscriber stations 10, 30 to be present in bus system 1 of the exemplary embodiments.

Subscriber stations 10, 30 described above, and the method executed by them, can be used particularly advantageously in a modified data protocol which was published on 2 May 2011 at the Internet page http://www.semiconductors.bosch.de in published document "CAN with Flexible Data Rate, White Paper, Version 1.0," and which enables, inter alia, an enlargement of the data field, as well as a shortening of the bit length for a part of the CAN message after arbitration has taken place.

Subscriber stations 10, 30 represent, in particular for CAN-FD, a possibility for increasing the transmission quality of CAN-FD in the range of standard CAN transmissions, using a significantly higher data rate.

The functionality of the exemplary embodiments described above can also be realized in a transceiver 13 or in a communication control device 11, etc. In addition or alternatively, transmit device 12 can be integrated into existing products.

Alternatively to the counting of voltage peaks and subsequent correction of the bus signal described above in the second and third exemplary embodiment, it is also possible to proceed as follows. As above, sum voltage USUM is acquired using summation block 127. However, in the present variant, instead of switch 129 and capacitor 130, a block can be provided that measures and/or evaluates the voltage peaks with regard to their amplitude level (magnitude of voltage U) and/or their temporal width. As a function of the result of the evaluation by the block, a correction is then carried out as already described with reference to the exemplary embodiments. For example, the correction can take place only after reaching specified threshold values for the amplitude level and/or temporal width of the voltage peaks.

What is claimed is:

1. A subscriber station for a bus system, comprising:
a first delay element for delaying a first signal of a differential signal, which first signal is applied to a first line of a bus of the bus system for effecting a voltage level on the first line;
a second delay element for delaying the first signal of the differential signal or a second signal of the differential signal, which second signal is applied to a second line of the bus of the bus system for effecting a voltage level on the second line; and
delay modification circuitry;
wherein:
the delay modification circuitry is arranged for supply of voltage levels on the first and second lines to the delay modification circuitry;
the delay modification circuitry is configured to correct (a) a reflective asymmetry, relative to a predefined voltage level, of falling edges of the voltage levels of one of the first and second lines that occur during first transitions with rising edges of the voltage levels of the other of the first and second lines that occur during the first transitions and (b) a reflective asymmetry, relative to the predefined voltage level, of rising edges of the voltage levels of the one of the first and second lines that occur during second transitions with falling edges of the voltage levels of the other of the first and second lines that occur during the second transitions;
the first transitions are each from a dominant state of the bus, during which the voltage level of the one of the first and second lines is at a high level and the voltage level of the other of the first and second lines is at a low level, to a recessive state of the bus, during which the voltage levels of the first and second lines are both approximately at a middle level that is between the high and low levels, the middle level being the predefined voltage level;
the second transitions are each from the recessive state to the dominant state; and
the delay modification circuitry is configured to perform the corrections by:
for each of the first transitions:
summing the supplied voltage levels prevailing on the bus during the respective first transition;
determining whether the respective sum of the respective first transition substantially deviates from the middle voltage level; and
responsive to, and based on, a result of the determination regarding the respective sum of the respective first transition being that the respective sum substantially deviates from the middle voltage level, and independent of voltage levels prevailing on the bus during any of the second transitions, modifying a respective delay effected by the delay elements in a subsequent one of the first transitions to reduce the deviation during the subsequent first transition; and
for each of the second transitions:
summing the supplied voltage levels prevailing on the bus during the respective second transition;
determining whether the respective sum of the respective second transition substantially deviates from the middle voltage level; and
responsive to, and based on, a result of the determination regarding the respective sum of the respective second transition being that the respective sum substantially deviates from the middle voltage level, and independent of voltage levels prevailing on the bus during any of the first transitions, modifying a respective delay effected by the delay elements in a in a subsequent one of the second transitions to reduce the deviation during the subsequent second transition.

2. The subscriber station as recited in claim 1, wherein the first and second delay elements are situated in one of: i) a CAN_L signal path, or ii) in the CAN_H signal path of a transmit device of the subscriber station.

3. The subscriber station as recited in claim 1, wherein the first and second delay elements are fashioned such that the delay times of the first and second delay elements are definitely smaller to definitely larger than a comparable delay time of a complementary path.

4. The subscriber station as recited in claim 1, wherein the delay modification circuitry includes:
a summation to sum the supplied voltages;
a capacitor for filtering the sums output by the summation block; and
an analog-digital converter for evaluating the filtered sums, wherein the modifications are performed based on output of the analog-digital converter.

5. The subscriber station as recited in claim 4, wherein the determinations include determining at least one of amplitude levels and temporal widths of voltage peaks in the sums.

6. The subscriber station as recited in claim 4, wherein:
the delay modification circuitry further includes a first accumulation register for counting voltage peaks in the sums at the second transitions and a second accumulation register for counting voltage peaks in the sums at the first transitions;

the subscriber station is configured so that:
for the second transitions, given a positive voltage peak in the sum voltage, the first accumulation register is incremented, and a delay of the first delay element is reduced; and
for the first transitions, given a positive voltage peak in the sum voltage, the second accumulation register is incremented, and a delay of the second delay element is reduced.

7. A bus system, comprising:
a bus; and
at least two subscriber stations connected to each other via the bus in such a way that the subscriber stations are capable of communicating with each other;
wherein:
at least one of the at least two subscriber stations includes:
a first delay element for delaying a first signal of a differential signal, which first signal is applied to a first line of the bus of the bus system for effecting a voltage level on the first line;
a second delay element for delaying the first signal of the differential signal or a second signal of the differential signal, which second signal is applied to a second line of the bus of the bus system for effecting a voltage level on the second line; and
delay modification circuitry;
the delay modification circuitry is arranged for supply of voltage levels on the first and second lines to the delay modification circuitry;
the delay modification circuitry is configured to correct (a) a reflective asymmetry, relative to a predefined voltage level, of falling edges of the voltage levels of one of the first and second lines that occur during first transitions with rising edges of the voltage levels of the other of the first and second lines that occur during the first transitions and (b) a reflective asymmetry, relative to the predefined voltage level, of rising edges of the voltage levels of the one of the first and second lines that occur during second transitions with falling edges of the voltage levels of the other of the first and second lines that occur during the second transitions;
the first transitions are each from a dominant state of the bus, during which the voltage level of the one of the first and second lines is at a high level and the voltage level of the other of the first and second lines is at a low level, to a recessive state of the bus, during which the voltage levels of the first and second lines are both approximately at a middle level that is between the high and low levels, the middle level being the predefined voltage level;
the second transitions are each from the recessive state to the dominant state; and
the delay modification circuitry is configured to perform the corrections by:
for each of the first transitions:
summing the supplied voltage levels prevailing on the bus during the respective first transition;
determining whether the respective sum of the respective first transition substantially deviates from the middle voltage level; and
responsive to, and based on, a result of the determination regarding the respective sum of the respective first transition being that the respective sum substantially deviates from the middle voltage level, and independent of voltage levels prevailing on the bus during any of the second transitions, modifying a respective delay effected by the delay elements in a subsequent one of the first transitions to reduce the deviation during the subsequent first transition; and for each of the second transitions:
summing the supplied voltage levels prevailing on the bus during the respective second transition;
determining whether the respective sum of the respective second transition substantially deviates from the middle voltage level; and
responsive to, and based on, a result of the determination regarding the respective sum of the respective second transition being that the respective sum substantially deviates from the middle voltage level, and independent of voltage levels prevailing on the bus during any of the first transitions, modifying a respective delay effected by the delay elements in a in a subsequent one of the second transitions to reduce the deviation during the subsequent second transition.

8. A method for reducing line-conducted emissions in a bus system, wherein a subscriber station of the bus system includes (a) a first delay element for delaying a first signal of a differential signal, which first signal is applied to a first line of a bus of the bus system for effecting a voltage level on the first line, and (b) a second delay element for delaying the first signal of the differential signal of a second signal of the differential signal, which second signal is applied to a second line of the bus of the bus system for effecting a voltage level on the second line, the method comprising:

correcting a reflective asymmetry, relative to a predefined voltage level, of falling edges of the voltage levels of one of the first and second delay elements lines that occur during first transitions with rising edges of the voltage levels of the other of the first and second lines that occur during the first transitions; and correcting a reflective asymmetry, relative to the predefined voltage level, of rising edges of the voltage levels of the one of the first and second lines that occur during second transitions with falling edges of the voltage levels of the other of the first and second lines that occur during the second transitions;

wherein:
the first transitions are each from a dominant state of the bus, during which the voltage level of the one of the first and second lines is at a high level and the voltage level of the other of the first and second lines is at a low level, to a recessive state of the bus, during which the voltage levels of the first and second lines are both approximately at a middle level that is between the high and low levels, the middle level being the predefined voltage level;

the second transitions are each from the recessive state to the dominant state; and the corrections are performed by:
for each of the first transitions:
summing the voltage levels prevailing on the bus during the respective first transition;
determining whether the respective sum of the respective first transition substantially deviates from the middle voltage level; and
responsive to, and based on, a result of the determination regarding the respective sum of the respective first transition being that the respective sum substantially deviates from the middle voltage level, and independent of voltage levels prevailing on the bus during any of the second transitions, modifying a respective delay effected by the delay elements in a subsequent one of the first transitions to reduce the deviation during the subsequent first transition; and for each of the second transitions:
summing the supplied voltage levels prevailing on the bus during the respective second transition;
determining whether the respective sum of the respective second transition substantially deviates from the middle voltage level; and
responsive to, and based on, a result of the determination regarding the respective sum of the respective second transition being that the respective sum substantially deviates from the middle voltage level, and independent of voltage levels prevailing on the bus during any of the first transitions, modifying a respective delay effected by the delay elements in a in a subsequent one of the second transitions to reduce the deviation during the subsequent second transition.

9. The method as recited in claim 8, wherein the delay elements are fashioned such that the delay times of the first and second delay elements are definitely smaller to definitely larger than a comparable delay time of a complementary path.

10. The method as recited in claim 8, wherein performance of the corrections further includes:
filtering, by a capacitor of the subscriber station, a result of the summing; and
evaluating, by an analog-digital converter of the subscriber station, a result of the filtering.

11. The method as recited in claim 10, wherein the determining includes determining at one of amplitude levels and temporal widths of voltage peaks in the sums.

12. The method as recited in claim 11, wherein performance of the corrections further includes:
counting, by a first accumulation register, voltage peaks in the sums at the second transitions; and
counting, by a second accumulation register, voltage peaks in the sums at the first transitions;
for the second transitions, given a positive voltage peak in the sum voltage, incrementing the first accumulation register, and reducing a delay of the first delay element based on the incremented first accumulation register; and
for the first transitions, given a positive voltage peak in the sum voltage, incrementing the second accumulation register, and reducing a delay of the second delay element based on the incremented second accumulation register.

13. A subscriber station for a bus system, comprising:
at least one delay element for delaying at least one of (a) a first signal of a differential signal, which first signal is applied to a first line of a bus of the bus system for effecting a voltage level on the first line, and (b) a second signal of the differential signal, which second signal is applied to a second line of the bus for effecting a voltage level on the second line; and
delay modification circuitry, wherein the delay modification circuitry is:
arranged for supply of voltage levels on the first and second lines to the delay modification circuitry; and
configured to, for each of at least one of (a) first transitions from a dominant state of the bus, during which the voltage level of one of the first and second lines is at a high level and the voltage level of the other of the first and second lines is at a low level, to a recessive state of the bus, during which the voltage levels of the first and second lines are both approximately at a middle level that is between the high and low levels, and (b) second transitions from the recessive state to the dominant state:

determine whether a respective sum of the supplied voltages of the first and second lines during the respective transition substantially deviates from the middle voltage level; and responsive to, and based on, a result of the determination regarding the respective sum of the respective transition being that the respective sum substantially deviates from the middle voltage level, modify a respective delay effected by the delay elements in a later occurring one of the transitions to reduce the deviation during the later occurring one of the transitions.

* * * * *